United States Patent [19]

Robson

[11] 4,456,421
[45] Jun. 26, 1984

[54] LIFTING APPARATUS

[76] Inventor: Robert Robson, 5 Badminton Close, Bragbury End, Stevenage, Hertfordshire, England

[21] Appl. No.: 305,896

[22] Filed: Sep. 25, 1981

[30] Foreign Application Priority Data

Sep. 25, 1980 [GB] United Kingdom ............... 8031010

[51] Int. Cl.³ .............................................. B60P 1/44
[52] U.S. Cl. .................................. 414/546; 414/541; 414/550; 414/917
[58] Field of Search .............. 414/540, 541, 546, 550, 414/917, 680, 682, 686

[56] References Cited

U.S. PATENT DOCUMENTS

| 3,182,826 | 5/1965 | Mutto | 414/541 |
| 3,233,758 | 2/1966 | Darfus | 414/540 |
| 3,952,890 | 4/1976 | Armstrong | 414/917 |

FOREIGN PATENT DOCUMENTS

| 1945062 | 10/1970 | Fed. Rep. of Germany | 414/540 |
| 2372715 | 8/1978 | France | 414/546 |

Primary Examiner—Bruce H. Stoner, Jr.
Assistant Examiner—James E. Barlow
Attorney, Agent, or Firm—Young & Thompson

[57] ABSTRACT

Lifting apparatus in combination with at least one substantially upright wall having an opening therein for providing access through the wall. The preferred combination comprises a vehicle, such as, a van (1), having a rear or side door opening therein, the lifting apparatus including a generally planar, load support portion (12) which is movable between a storage position (A,C) interior of the vehicle (1) and an operative position (B) exterior of the vehicle. In the operative position (B), the load support portion (12) lies in a generally horizontal plane substantially normal to that of the vehicle opening, with the support portion (12) being movable between its storage position (A,C) and its operative position (B) via an intermediate, inoperative position exterior of the vehicle (1). In this inoperative position, the load support portion (12) lies in a generally vertical plane substantially normal to that of the opening to provide substantially unobstructed access through the opening to the vehicle interior. The lifting apparatus preferably comprises a parallelogram-type raising and lowering portion (9,9') operated by a piston cylinder arrangement (8,8'), the load support portion (12) being pivotally movable between its intermediate and operative positions with respect to the raising and lowering portion.

7 Claims, 3 Drawing Figures

LIFTING APPARATUS

DESCRIPTION

This invention relates to lifting apparatus in combination with an opening through which a load is to be moved by such apparatus. The invention is especially, but not exclusively, related to vehicles incorporating such a combination wherein the opening is located in at least one substantially upright wall of the vehicle.

Known lifting apparatus associated with vehicles comprises a load-supporting platform located at a rear or side opening of, say, a van or lorry. In the case of the rear opening of a vehicle, this platform lies in a generally vertical plane transverse to the axis of the vehicle, when in a storage position, whereby access to the interior of the vehicle via the rear opening is obstructed, usually completely.

In its operative position, the platform, lies in a generally horizontal plane substantially exterior of the vehicle. In both its operative and storage positions, the platform lies transverse to the vehicle access and is supported at either or one side by a suitable upright support located within the vehicle adjacent the respective side or sides of the rear opening. Such forms of upright support may be in the form of telescopic pillars or slotted channel members which are connected together at their top ends by a strut or tie extending transversely with respect to the vehicle axis. Apart from providing added strength to the support structure for the platform, this strut or tie may also be used to house any associated operating cables or hydraulic or pneumatic conduits.

Thus, it can be seen that the prior art lifting apparatus provides a semi-permanent structure at the rear or side opening of a van or lorry, whereby, when the platform is in either its vertical storage position or horizontal operative position, the opening is usually completely or substantially obstructed, thus preventing ready access to the interior of the vehicle.

The present invention sets out to overcome this major disadvantage associated with known forms of lifting apparatus for vehicles, as well as that associated with similar forms of apparatus in combination with doorways or loading openings in other structures, such as, warehouses, hospitals and other types of buildings.

In accordance with one aspect of the invention, there is provided, in combination, at least one substantially upright wall having an opening therein, for providing accesss through said wall, and lifting apparatus including a parallelogram-type raising and lowering position and a generally planar, load support portion connected thereto, said raising and lowering portion being movable between a position on one side of said opening, wherein said load support portion lies in a generally vertical plane in an inoperative storage position on said one side of said opening, and a position on the other side of said opening, wherein said load support portion lies in a generally vertical plane substantially normal to that of said opening in an intermediate inoperative position on said other side of said opening, said load support portion being movable with respect to said raising and lowering portion between said intermediate position and an operative position wherein it lies in a generally horizontal plane substantially normal to that of said opening and on said other side thereof, and said raising and lowering portion being actuated to move said load support portion, in its operative positions, between raised and lowered positions with respect to said opening.

The invention also provides a vehicle comprising at least one substantially upright wall having an opening therein, for providing access to the interior of the vehicle, and lifting apparatus including a parallelogram-type raising and lowering portion and a generally planar, load support portion connected thereto, said raising and lowering portion being movable between a position on one side of said opening interior of said vehicle, wherein said load support portions lies in a generally vertical plane in an inoperative storage position interior of said vehicle, and a position on the other side of said opening exterior of said vehicle, wherein said load support portion lies in a generally vertical plane substantially normal to that of said opening in an intermediate inoperative position exterior of said vehicle, said load support portion being movable with respect to said raising and lowering portion between said intermediate position and an operative position wherein it lies in a generally horizontal plane substantially normal to that of said opening exterior of said vehicle, and said raising and lowering portion being actuable to move said load support portion, in its operative position, between raised and lowered positions with respect to said opening.

The raising and lowering portion can be moved between raised and lowered positions exterior of the vehicle to move the load support portion, in its operative position, between upper and lower working positions. Additionally, the load support portion can be moved into its intermediate inoperative position with respect to the raising and lowering portion, when the latter is in its raised, lowered or an intermediate position exterior of the vehicle, to provide the substantially unobstructed access to the vehicle interior via the opening. Also, with the load support portion in its inoperative position, and the raising and lowering portion in its raised position, the latter can be positioned within the interior of the vehicle with the support portion in one of two alternative storage positions, of which one provides substantially unobstructed access to the vehicle interior via the opening.

In order that the invention may be more fully understood, a preferred embodiment in accordance therewith will now be described by way of example and with reference to the accompanying drawings in which.

Figure 1:
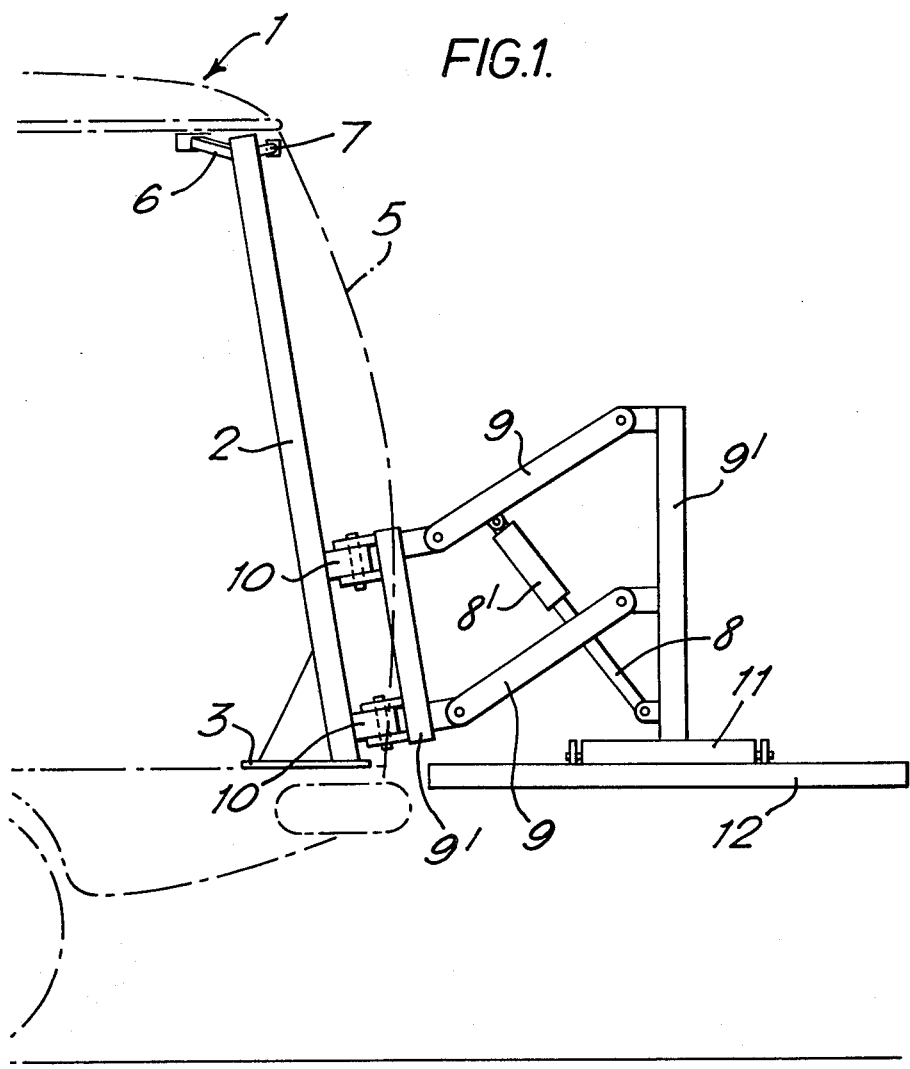
FIG. 1 is a side elevation of lifting apparatus associated with and adjacent the rear doorway of a van, with a raising and lowering portion located in a raised position exterior of the van and with a load support portion in its operative position.

Referring to the drawings, a lifting apparatus is secured in the rear of a van 1, adjacent the rear doorway thereof, by means of a single substantially upright pillar 2 secured at its lower end to the van floor, via a securing plate 3, and at its upper end to the upper regions of the side and rear walls 4, 5 of the van by means of respective bracing straps 6, 7.

A raising and lowering portion of the apparatus, in the form of a piston/cylinder 8, 8' operable, when parallelogram linkage 9, 9' is pivotally connected to the pillar 2, for pivotal movement about a near vertical axis, via a pair of pivots 10. To the lower end of the right hand parallelogram linkage 9' is pivotally secured, by an elongate pivot connection 11, a load support portion in the form of a platform 12 pivotable about a horizontal axis defined by the pivot connection 11.

Figure 2:
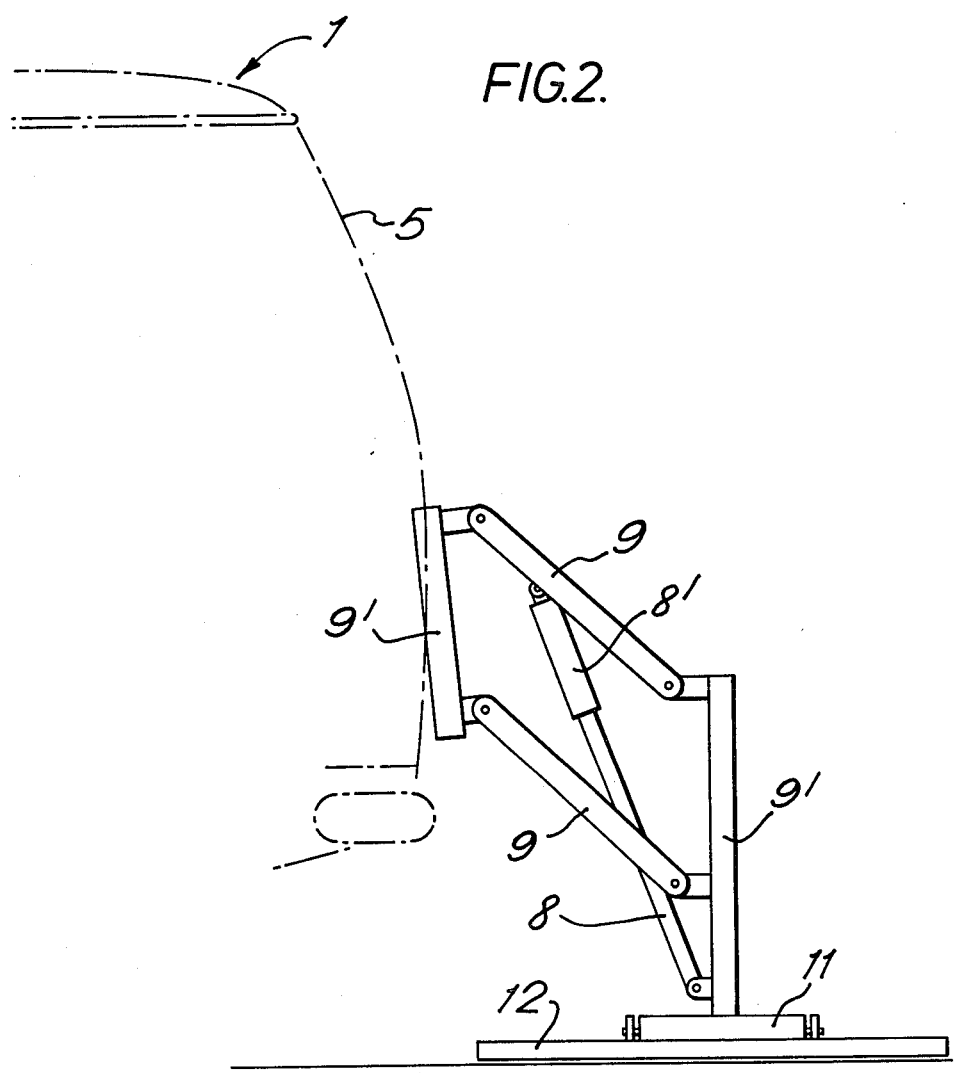
FIG. 2 is a side elevation of the lifting apparatus shown in FIG. 1 but with the raising and lowering portion located in a lowered position exterior of the van.

With particular reference to FIG. 1, the lifting apparatus is shown located exterior of the van 1 with the raising and lowering portion in a raised position and the platform 12 in its operative position, that is, lying generally horizontally and normal to the plane of the doorway. To move the lifting apparatus to the attitude shown in FIG. 2, the piston/cylinder arrangement 8, 8', operable by electro-mechanical means, is actuated such that the piston 8 is moved outwardly from the cylinder 8'. As a consequence, the horizontal platform 12 transverses an arc until it reaches the position at ground level in FIG. 2, whereby the raising and lowering portion is now in a lowered position. Any goods to be transported in the van 1 can now be loaded on to the platform 12 which is subsequently raised to the level of the floor of the van 1 by reversing the operation of the raising and lowering portion, as described above. With the raising and lowering portion in this raised position, the goods can now be loaded from the platform 12 into the van 1 through the rear doorway thereof.

Once the goods have been loaded into the van 1 from the platform 12, the latter can then be pivoted upwardly through approximately 90° about the pivotal connection 11 into an intermediate inoperative position, with its plane extending substantially vertically and normal to that of the doorway.

Figure 3:
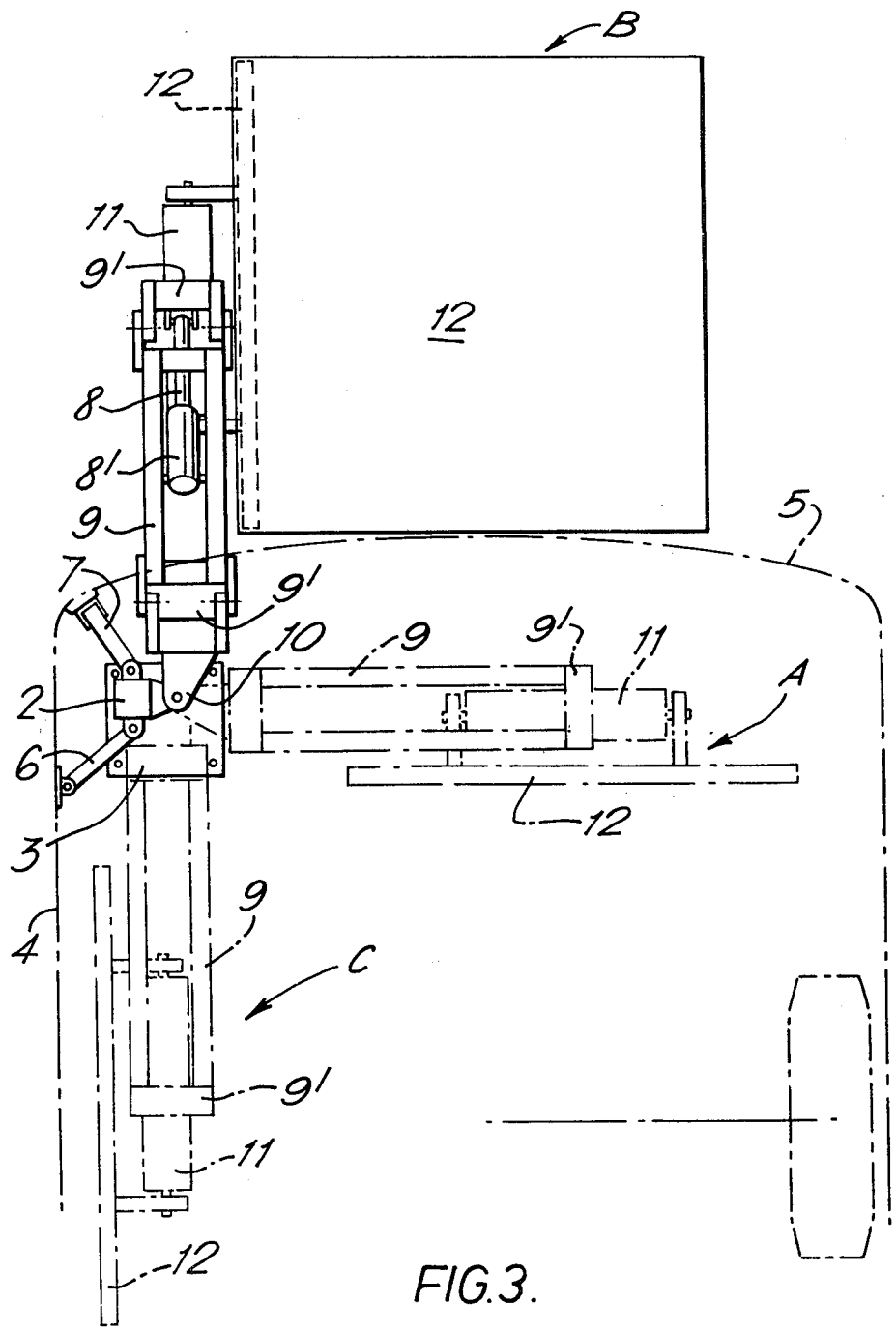
FIG. 3 is a plan view of the apparatus shown in FIGS. 1 and 2, with the load support portion shown in full outline in its operative position and in dashed outline in alternative storage positions.

Depending upon the amount and positioning of the goods within the interior of the van 1, the lifting apparatus, that is, the raising and lowering portion and the platform 12 in the inoperative position, can be pivoted about the pivots 10 into one of two storage positions within the van interior, as shown in dashed outline in FIG. 3.

If the van 1 is substantially fully loaded, then the lifting apparatus is pivoted through approximately 90° into a storage position A, such that it extends generally transversely with respect to the axis of the van 1. However, if access to the van interior, through the rear doorway thereof, is required, then the lifting apparatus can be pivoted outwardly to its original exterior position of the van 1, as shown at B in FIG. 3 but with the platform 12 in its vertical intermediate inoperative position, shown in dashed outline.

Provided that there is sufficient space in the van interior, then the lifting apparatus can be pivoted from its position exterior of the van 1 through approximately 180° into another storage position C, such that it extends generally axially of the van 1, substantially parallel to and adjacent the side wall 4. In this storage position C, there is no need to move the lifting apparatus to its position exterior of the van 1, in order to provide any necessary access through the rear doorway.

Although the parallelogram linkage 9, 9' of the raising and lowering portion of the lifting apparatus is described above as being operable by an electromechanical piston/cylinder arrangement, it will be appreciated that the linkage can be operated by any other suitable form of piston/cylinder arrangement, such as, hydraulically or pneumatically. Indeed, the raising and lowering portion need not be in the form of a parallelogram linkage but may be constituted by any suitable raising and lowering equipment, as long as its associated load support portion can be moved between its operative, inoperative and storage positions, such that, when in the intermediate inoperative position, substantially unobstructed access through the associated opening is provided.

Although the above description is related to lifting apparatus associated with the rear doorway of a vehicle, that is the van 1, it will also be appreciated that such apparatus can be used in association with any opening used for loading, in particular a side doorway of a vehicle, wherein unobstructed access through the opening is required when the apparatus is not in use.

In the case of vehicles, the present invention provides substantial advantages over the known forms of lifting apparatus for the rear or side doorways of vans and lorries, in that such known arrangements have the doorway permanently and substantially completely obstructed while the lifting apparatus is not being used.

What is claimed is:

1. In combination, at least one substantially upright wall defining an opening therein, for providing access through said wall, and lifting apparatus including a parallelogram-type raising and lowering portion that is extensible and collapsible in a first generally vertical plane and that comprises parallelogram linkage one side of which is secured against vertical movement and an opposite side of which moves bodily vertically, and a generally planar, load support portion connected thereto, said raising and lowering portion being pivotable about a generally vertical axis between a position on one side of said opening, wherein said load support portion lies in a second generally vertical plane generally parallel to said first plane in an inoperative storage position, and a position on the other side of said opening, wherein said load support portion lies in a third generally vertical plane substantially normal to that of said opening and generally parallel to said first plane in an intermediate inoperative position, said load support portion being pivotable about a generally horizontal axis with respect to said raising and lowering portion between said intermediate position and an operative position, wherein it lies in a generally horizontal plane substantially normal to that of said opening and on said other side thereof, said raising and lowering portion being actuable to move said load support portion, in its operative position, between raised and lowered positions with respect to said opening, and the connection between said load support portion and said raising and lowering portion being horizontal pivot means having an axis parallel to said first plane and integral with said opposite side of said parallelogram linkage such that said load support portion is immovable about a vertical axis with respect to said raising and lowering portion.

2. A combination according to claim 1, comprising a vehicle having a plurality of interior side walls, said generally vertical axis being disposed adjacent one of said walls, said load support portion being disposed between said raising and lowering portion and said one wall in said inoperative storage position.

3. A combination according to claim 1, wherein said raising and lowering portion can be positioned in alternative storage positions on said one side of the opening with said load support portion lying in respective, generally vertical planes in an inoperative position.

4. A combination according to claim 1, wherein said raising and lowering portion is pivotally movable, in unison with said load support portion, between said inoperative positions on said one and said other side of the opening.

5. A combination according to claim 1, wherein said raising and lowering portion is actuable, to move said load support portion between said raised and lowered positions with respect to said opening, by means of an electro-mechanically operable piston/cylinder arrangement of which one end is attached to one side of said raising and lowering portion connected to said load support portion and the other end is attached to another side of said raising and lowering portion adjacent said one side thereof.

6. A combination according to claim 1, wherein said load support portion is movable between its intermediate inoperative and operative positions with respect to said raising and lowering portion, with said load support portion in fully raised and lowered positions with respect to said opening.

7. A combination according to claim 6, wherein said load support portion is movable between its intermediate inoperative and operative positions with respect to said raising and lowering portion at any position between its fully raised and fully lowered positions with respect to said opening.

* * * * *